(12) United States Patent
Amro et al.

(10) Patent No.: US 6,950,861 B1
(45) Date of Patent: Sep. 27, 2005

(54) SYSTEM AND METHOD FOR SEARCHING WEBSITES ASSOCIATED WITH BOOKMARKS

(75) Inventors: Hatim Amro, Austin, TX (US); Robert G. Nadon, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 707 days.

(21) Appl. No.: 09/668,500

(22) Filed: Sep. 22, 2000

(51) Int. Cl.[7] .............................................. G06F 15/16
(52) U.S. Cl. .................. 709/219; 709/203; 709/217; 709/229
(58) Field of Search ............................... 709/203, 218, 709/219, 225; 707/3, 10

(56) References Cited

U.S. PATENT DOCUMENTS

| | | | | |
|---|---|---|---|---|
| 6,163,778 A | * | 12/2000 | Fogg et al. | 707/10 |
| 6,212,522 B1 | * | 4/2001 | Himmel et al. | 707/10 |
| 6,256,639 B1 | * | 7/2001 | Himmel et al. | 709/219 |
| 6,314,423 B1 | * | 11/2001 | Himmel et al. | 709/218 |
| 6,324,566 B1 | * | 11/2001 | Himmel et al. | 709/203 |
| 6,480,853 B1 | * | 11/2002 | Jain | 709/225 |
| 6,493,702 B1 | * | 12/2002 | Adar et al. | 707/3 |
| 6,633,316 B1 | * | 10/2003 | Maddalozzo et al. | 709/203 |

* cited by examiner

*Primary Examiner*—Rupal Dharia
*Assistant Examiner*—Quang N. Nguyen
(74) *Attorney, Agent, or Firm*—Haynes and Boone, LLP

(57) ABSTRACT

A method that includes receiving a search term and an identifier associated with a bookmark is provided. A database is searched using the search term and a website associated with the bookmark is also searched using the search term.

7 Claims, 4 Drawing Sheets

SYSTEM AND METHOD FOR SEARCHING WEBSITES ASSOCIATED WITH BOOKMARKS

BACKGROUND

The disclosures herein relate generally to computer systems and more particularly to searching websites associated with bookmarks using a computer system.

Web browsers such as Netscape Navigator and Microsoft Internet Explorer typically include a feature that allows a user to store a reference to a website. These references are referred to as bookmarks by Netscape Navigator and favorites by Microsoft Internet Explorer. The term bookmark will be used herein to refer to a reference to a website stored by a user. Web browsers provide a user with the ability to view the user's bookmarks and may provide a user with the ability to organize the user's bookmarks. A user, however, may store many bookmarks. The user may then be unable to easily locate a particular bookmark in the user's list of bookmarks to access a website associated with the bookmark. In addition, a user may forget which bookmark is associated with information on a website the user wishes to access.

Therefore, what is needed is a system and method for searching a website associated with a bookmark.

SUMMARY

One embodiment, accordingly, provides a method that includes receiving a search term and an identifier associated with a bookmark. A database is searched using the search term and a website associated with the bookmark is also searched using the search term.

A principal advantage of this embodiment is that it allows a user to locate previously stored information. A user may more quickly identify information for which the user is searching and may access that information in an efficient manner. The embodiment may also allow the user to more effectively use features of a web browser.

DETAILED DESCRIPTION

Figure 1:
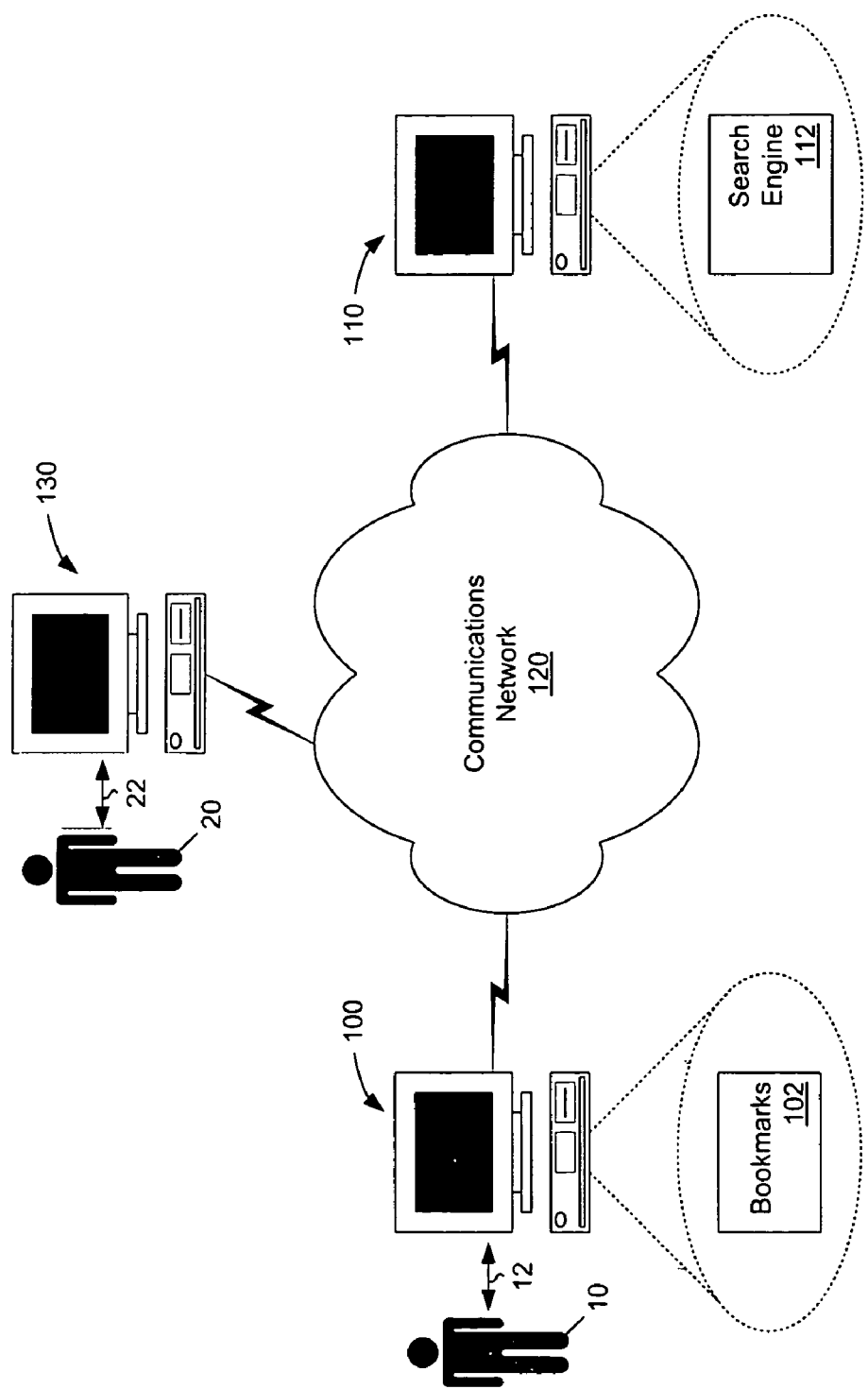
FIG. 1 is a diagram illustrating an embodiment of computer systems coupled to a communications network.

FIG. 1 is a diagram illustrating an embodiment of computer systems coupled to a communications network 120. In FIG. 1, a computer system 100, a computer system 110, and a computer system 130 are coupled to communications network 120. Computer system 100 includes bookmarks 102, and computer system 110 includes search engine 112.

Search engine 112 may be any search engine accessible using communications network 120 such as Lycos (http://www.lycos.com), AltaVista (http://www.altavista.com), HotBot (http://www.hotbot.com), Webcrawler (http://www.webcrawler.com), or a private search engine available only to certain users.

Computer systems 100, 110, and 130 may be any type of computing device configured to process, receive, and transmit information. Computer system 100 receives inputs from and provides outputs to a user 10 as indicated by arrows 12. Similarly, computer system 130 receives inputs from and provides outputs to a user 20 as indicated by arrows 22.

Communications network 120 may be any type of wired or wireless network configured to receive and transmit information such as the Internet, an intranet, a local area network (LAN), or a wide area network (WAN).

Web browsers such as Netscape Navigator and Microsoft Internet Explorer typically include a feature that allows a user to store a reference to a website. These references are referred to as bookmarks by Netscape Navigator and favorites by Microsoft Internet Explorer. The term bookmark will be used herein to refer to a reference to a website stored by a user.

As shown in FIG. 1, user 10, using a web browser, causes bookmarks 102 to be stored on computer system 100. Bookmarks 102 may be stored in a bookmark file. To search websites associated with bookmarks 102, user 10 provides a search term to search engine 112 on computer 110 using communications network 120. An identifier for each bookmark in bookmarks 102 is also provided to search engine 112. A script written in the Java programming language may be used to generate the identifiers. In one embodiment, an identifier includes a URL (Uniform Resource Locator) or a website address associated with a bookmark. In other embodiments, identifiers may include other information. User 10 may select an indicator to cause search engine 112 to search websites associated with bookmarks 102. Alternatively, a search engine may automatically cause websites associated with bookmarks 102 to be searched.

A user may also cause websites associated with bookmarks on a remote computer system to be searched. In FIG. 1, user 20 inputs a search term into computer system 130 and specifies that websites associated with bookmarks 102 on computer system 100 are to be searched. Search engine 112 receives the search term and accesses bookmarks 102 to obtain identifiers for the websites associated with bookmarks 102. Search engine 112 performs a search of a database and the websites associated with bookmarks 102 using the search term and provides the search results to computer system 130. Computer system 130 displays the search results to user 20.

Figure 2:
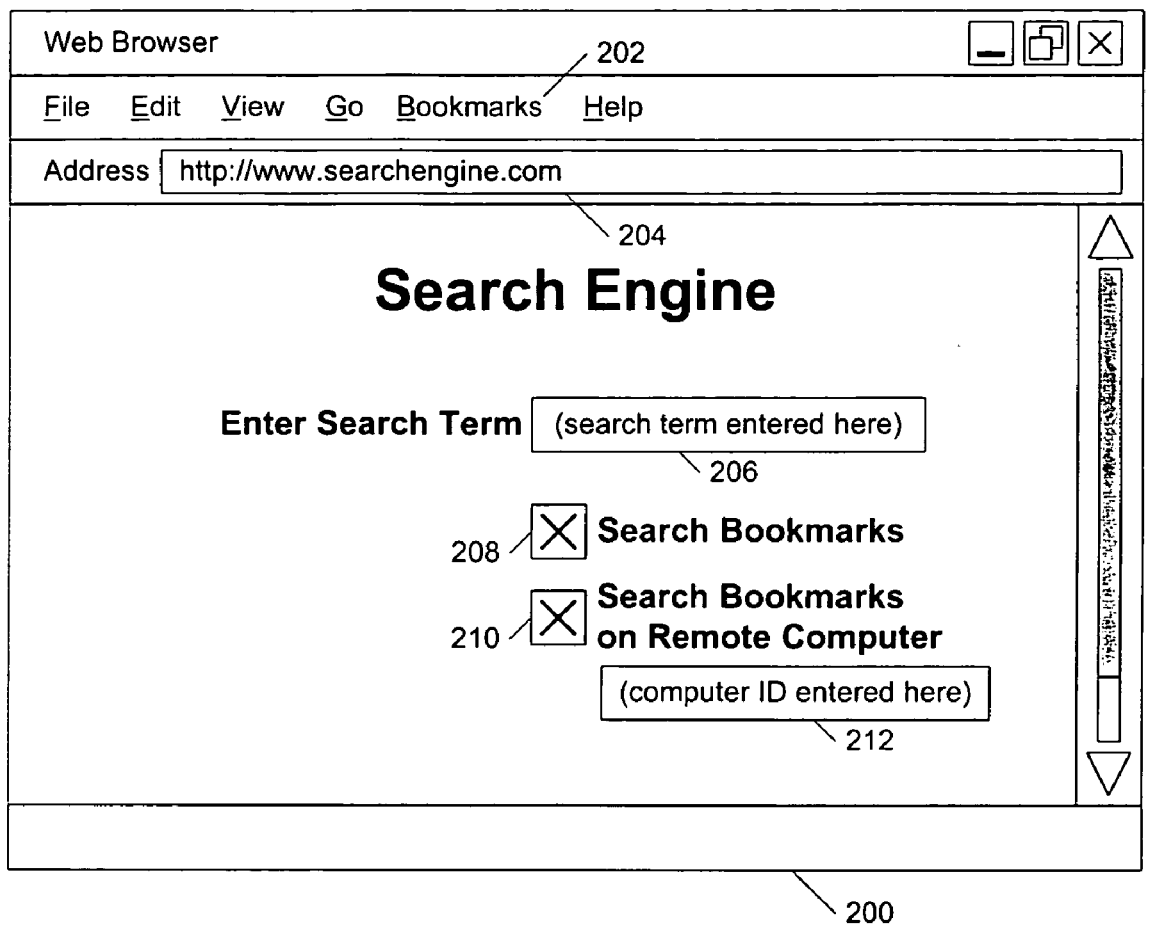
FIG. 2 is a diagram illustrating an embodiment of a user interface of a web browser configured to allow a user to access a search engine.

FIG. 2 is a diagram illustrating an embodiment of a user interface 200 of a web browser configured to allow a user to access a search engine. FIG. 2 shows an example search engine website using a web browser. The web browser may be run on computer system 100 or computer system 130 shown in FIG. 1. The example search engine website is accessed using a URL, http://www.searchengine.com, entered into box 204, or alternatively, access using "Bookmarks" menu 202, to cause the search engine website to be displayed as shown.

A user inputs a search term into box 206 to cause the search engine to perform a search using the search term. The user also selects checkbox 208, as indicated by the X in checkbox 208, to cause websites associated with the user's bookmarks to be searched. The user may also select checkbox 210, as indicated by the X in checkbox 210, to cause websites associated with bookmarks stored on a remote computer system to be searched. The user inputs an identifier of the remote computer system in box 212. This identifier may be a URL or another type of information that designates bookmarks stored on a particular computer. The bookmarks on the remote computer system may be the user's own bookmarks or another user's bookmarks.

Referring back to FIG. 1, search engine 112, executing on computer system 110, receives a search term and one or more identifiers associated with bookmarks 102 from computer system 100. Search engine 112 searches a database using the search term. The database may be a part of search engine 112 or may be located on a remote computer system (not shown). Search engine 112 also searches websites associated with bookmarks 102. Search engine 112 then provides the 10 results of searching the database and the websites to computer system 100.

Search engine 112 may also receive a search term and an identifier that identifies computer system 110 from computer system 130. In this case, search engine 112 causes bookmarks 102 on computer system 100 to be accessed and receives identifiers associated with bookmarks 102. Search engine 112 searches the database and websites associated with bookmarks 102 and provides the results of the searches to computer system 130.

In response to receiving results from search engine 112, computer system 110 displays the results to user 10. User 10 selects a result to cause a website associated with the one of bookmarks 102 to be displayed. Search engine 112 may also provide an advertisement to be displayed on computer system 110. Search engine 112 may use the search term and/or information from the identifiers associated with bookmarks 102 to select the advertisement to be provided to user 10. In this way, an advertisement can be targeted for user 10 based on a preference of user 10 deduced from the search term and/or information from bookmarks 102. Computer system 130 operates similarly in response to receiving results from search engine 112.

Figure 3:
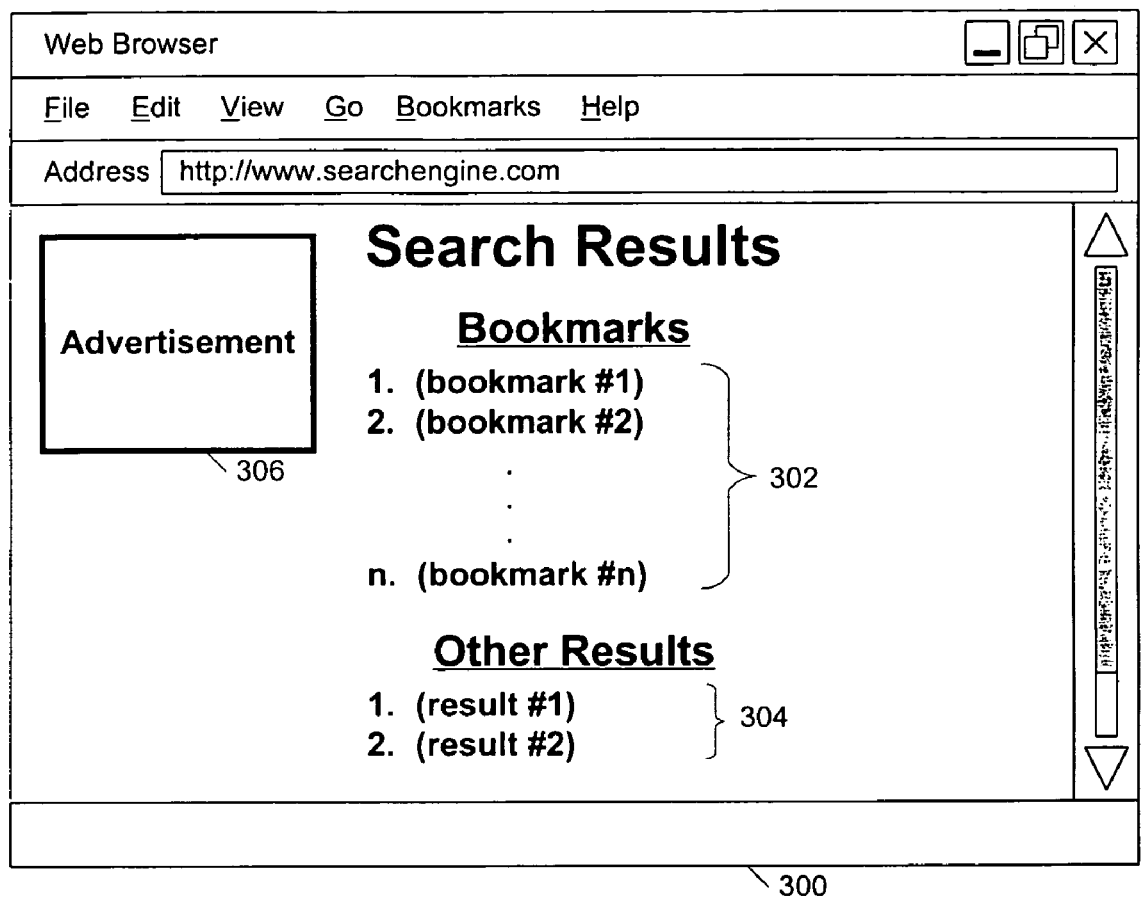
FIG. 3 is a diagram illustrating an embodiment of a user interface of a web browser configured to display results from a search engine.

FIG. 3 is a diagram illustrating an embodiment of a user interface 300 of a web browser configured to display results from a search engine. Results are displayed in user interface 300 as shown. The results include bookmark results 302 and other results 304. Bookmark results 302 and other results 304 are displayed on separate sections of the webpage as shown. In other embodiments, bookmark results 302 may be specially highlighted or displayed in a separate window to draw a user's attention. A user may select one of bookmark results 302 and one of other results 304 to cause a webpage associated with the selected result to be displayed.

An advertisement 306 may also be displayed in the results webpage. Advertisement 306 may be selected by the search engine based on the search term and/or information from bookmarks used in the search.

Figure 4A:
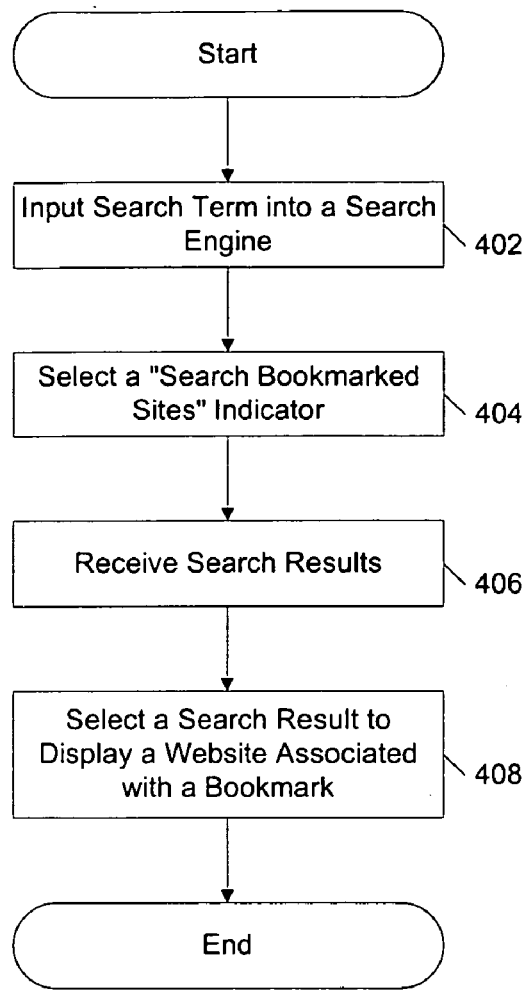
FIG. 4a is a flowchart illustrating an embodiment of a method for searching websites associated with bookmarks.

FIG. 4a is a flowchart illustrating an embodiment of a method for searching websites associated with bookmarks from the perspective of a user. A search term is input into a search engine as indicated in step 402. A "Search Bookmarked Sites" indicator is selected as indicated in step 404. Where a search engine is set to search websites associated with bookmarks by default, this step may be omitted. Search results are received as indicated in step 406. The search results may be presented to the user in any suitable manner such as displaying them on a user device. The search results associated with bookmarked websites may be highlighted or displayed separately from other search results. A search result is selected to display a website associated with the bookmark as indicated in step 408.

Figure 4B:
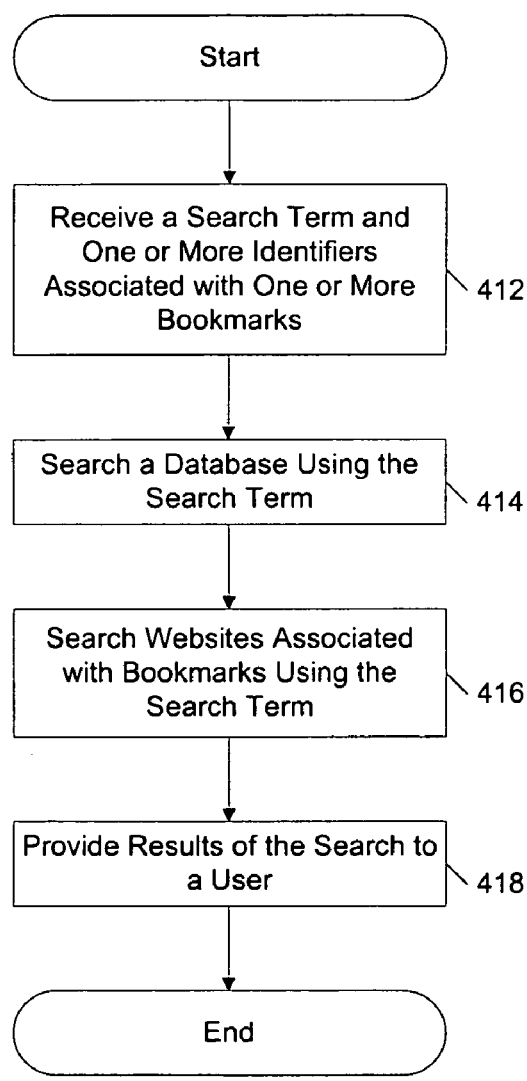
FIG. 4b is a flowchart illustrating an embodiment of a method for searching websites associated with bookmarks.

FIG. 4b is a flowchart illustrating an embodiment of a method for searching websites associated with bookmarks from the perspective of a search engine. A search term and one or more identifiers associated with one or more bookmarks are received as indicated in step 412. One identifier may be received for each of a user's bookmarks. In one specific embodiment, an identifier is an address of a website. A database is searched using the search term as indicated in step 414. It may be noted that the database may be directly associated with the search engine or may be accessed remotely. Websites associated with the bookmarks are searched using the search term as indicated in step 416. Results of the search are provided to a user as indicated in step 418.

As can be seen, the principal advantages of these embodiments are that they allow a user to locate previously stored information. A user may more quickly identify information for which the user is searching and may access that information in an efficient manner. The embodiments may also allow the user to more effectively use features of a web browser. The embodiments may supplement the organizational aspects of bookmarks by allowing a user to search websites associated with the bookmarks.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method comprising:
providing a first computer system with associated user access, the first computer system including bookmarks;
providing a second computer system including a search engine;
providing a remote computer system with associated user access, the remote computer system including bookmarks, each of the computer systems being interconnected via a communications network;
a user selecting an indicator to cause the search engine to search websites associated with the bookmarks stored on either of the first and the remote computer systems;
a user inputting a search term into the first computer system that specifies that websites associated with the bookmarks are to be searched;
a user inputting an identifier of the remote computer system;
the search engine receiving the search term and accessing the bookmarks to obtain identifiers for the websites associated with the bookmarks and providing search results to the first computer system;
providing a user interface of a web browser to allow users to access the search engine, the web browser to be run on either of the first and the remote computer systems for:
inputting a search term to cause the search engine to perform a search using the search term;
inputting an identifier of the remote computer system;
making a selection to cause websites associated with bookmarks stored on the first computer to be searched; and
making a selection to cause websites associated with bookmarks stored on the remote computer system to be searched; and
displaying the search results to the first computer system.

2. The method of claim 1, further comprising:
using a uniform resource locator (URL) to access the websites.

3. The method of claim 1 further comprising:
the search engine, executing on the second computer system, receiving the search term and at least one identifier associated with bookmarks from the first computer system;
the search engine searching a database using the search term;
the search engine searching websites associated with the bookmarks; and
the search engine providing the results of searching the database and the websites to the first computer system.

4. The method of claim 1 further comprising:
the search engine identifying the second computer system from the remote computer system.

5. The method of claim 1 further comprising:
the search engine causing the bookmarks on the first computer system to be accessed so that the search engine receives the identifiers associated with the bookmarks.

6. The method of claim 5 further comprising:
the search engine providing an advertisement to be displayed on the first computer system.

7. The method of claim 6 further comprising:
the search engine using the search term and information from the identifiers to select the advertisement to be provided to a user.

* * * * *